(12) United States Patent
Nikami et al.

(10) Patent No.: US 7,617,389 B2
(45) Date of Patent: Nov. 10, 2009

(54) EVENT NOTIFYING METHOD, EVENT NOTIFYING DEVICE AND PROCESSOR SYSTEM PERMITTING INCONSISTENT STATE OF A COUNTER MANAGING NUMBER OF NON-NOTIFIED EVENTS

(75) Inventors: Atsuyuki Nikami, Kawasaki (JP); Masaaki Nagatsuka, Kawasaki (JP); Toshiyuki Shimizu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 354 days.

(21) Appl. No.: 11/032,193

(22) Filed: Jan. 11, 2005

(65) Prior Publication Data

US 2005/0120358 A1 Jun. 2, 2005

Related U.S. Application Data

(63) Continuation of application No. PCT/JP02/012187, filed on Nov. 21, 2002.

(51) Int. Cl.
G06F 9/00 (2006.01)
G06F 13/24 (2006.01)

(52) U.S. Cl. .................... 712/244; 710/263

(58) Field of Classification Search ........... 712/244; 710/52, 54, 57, 263
See application file for complete search history.

(56) References Cited

U.S. PATENT DOCUMENTS

| | | | | |
|---|---|---|---|---|
| 5,542,076 A * | 7/1996 | Benson et al. | ............. | 710/260 |
| 5,671,365 A * | 9/1997 | Binford et al. | ............. | 710/100 |
| 5,742,650 A * | 4/1998 | Nuckolls et al. | ............. | 375/376 |
| 5,805,883 A * | 9/1998 | Saitoh | ............. | 718/105 |
| 6,263,397 B1 * | 7/2001 | Wu et al. | ............. | 710/268 |
| 6,292,856 B1 * | 9/2001 | Marcotte | ............. | 710/39 |
| 6,434,630 B1 * | 8/2002 | Micalizzi et al. | ............. | 710/5 |
| 6,460,095 B1 * | 10/2002 | Ueno et al. | ............. | 710/52 |
| 6,622,193 B1 * | 9/2003 | Avery | ............. | 710/263 |
| 6,633,941 B2 * | 10/2003 | Dunlap et al. | ............. | 710/262 |
| 6,760,799 B1 * | 7/2004 | Dunlap et al. | ............. | 710/260 |
| 7,177,963 B2 * | 2/2007 | Burns et al. | ............. | 710/52 |
| 2002/0172319 A1 * | 11/2002 | Chapple et al. | ............. | 377/1 |
| 2003/0084214 A1 * | 5/2003 | Dunlap et al. | ............. | 710/52 |
| 2003/0112757 A1 * | 6/2003 | Thibodeau et al. | ............. | 370/231 |

FOREIGN PATENT DOCUMENTS

| | | |
|---|---|---|
| JP | 60-175157 | 9/1985 |
| JP | 62-206657 | 9/1987 |
| JP | 5-120073 | 5/1993 |
| JP | 7-262022 | 10/1995 |
| JP | 7-295862 | 11/1995 |
| JP | 8-36498 | 2/1996 |
| JP | 8-297582 | 11/1996 |

(Continued)

*Primary Examiner*—Eddie P Chan
*Assistant Examiner*—William B Partridge
(74) *Attorney, Agent, or Firm*—Staas & Halsey LLP (57) ABSTRACT

An event notifying method notifies one or a plurality of events from a device to a processor by queuing to a queue in a processor system having one or a plurality of processors. A number of non-notified events existing in the queue is managed by a counter unit, and an inconsistent state of the counter unit caused by differences in updating timings of the counter unit from the device and the processor is temporarily permitted.

19 Claims, 10 Drawing Sheets

| PRIOR TO UPDATING/ AFTER UPDATING | NEGATIVE VALUE | 0 | ≥ 1 & < (THRESHOLD VALUE) | ≥ (THRESHOLD VALUE) |
|---|---|---|---|---|
| NEGATIVE VALUE | NO PROCESSING | NO PROCESSING | START TIMER | GENERATE INTERRUPT |
| 0 | NO PROCESSING | NO PROCESSING | START TIMER | GENERATE INTERRUPT |
| ≥ 1 & < (THRESHOLD VALUE) | STOP TIMER | STOP TIMER | NO PROCESSING (CONTINUE TIMER OPERATION) | STOP TIMER & GENERATE INTERRUPT |
| ≥ (THRESHOLD VALUE) | STOP INTERRUPT & UPDATE INTERRUPT DESTINATION | STOP INTERRUPT & UPDATE INTERRUPT DESTINATION | START TIMER & STOP INTERRUPT & UPDATE INTERRUPT DESTINATION | NO PROCESSING (CONTINUE INTERRUPT) |

FOREIGN PATENT DOCUMENTS

| | | |
|---|---|---|
| JP | 9-23110 | 1/1997 |
| JP | 9-204311 | 8/1997 |
| JP | 2000-200176 | 7/2000 |
| JP | 2001-335219 | 12/2001 |
| JP | 2002-55846 | 2/2002 |

* cited by examiner

| PRIOR TO UPDATING / AFTER UPDATING | NEGATIVE VALUE | 0 | ≥1 & <(THRESHOLD VALUE) | ≥(THRESHOLD VALUE) |
|---|---|---|---|---|
| NEGATIVE VALUE | NO PROCESSING | NO PROCESSING | START TIMER | GENERATE INTERRUPT |
| 0 | NO PROCESSING | NO PROCESSING | START TIMER | GENERATE INTERRUPT |
| ≥1 & <(THRESHOLD VALUE) | STOP TIMER | STOP TIMER | NO PROCESSING (CONTINUE TIMER OPERATION) | STOP TIMER & GENERATE INTERRUPT |
| ≥(THRESHOLD VALUE) | STOP INTERRUPT & UPDATE INTERRUPT DESTINATION | STOP INTERRUPT & UPDATE INTERRUPT DESTINATION | START TIMER & STOP INTERRUPT & UPDATE INTERRUPT DESTINATION | NO PROCESSING (CONTINUE INTERRUPT) |

FIG.11

EVENT NOTIFYING METHOD, EVENT NOTIFYING DEVICE AND PROCESSOR SYSTEM PERMITTING INCONSISTENT STATE OF A COUNTER MANAGING NUMBER OF NON-NOTIFIED EVENTS

This application is a continuation application filed under 35 U.S.C. 111(a) claiming the benefit under 35 U.S.C. 120 and 365(c) of a PCT International Application No. PCT/JP2002/012187 filed Nov. 21, 2002, in the Japanese Patent Office, the disclosure of which is hereby incorporated by reference.

BACKGROUND OF THE INVENTION

1. Field of the Invention

The present invention generally relates to event notifying methods, devices and processor systems, and more particularly to an event notifying method for notifying a large number of events to a processor, a device which employs such an event notifying method, and a processor system which employs such an event notifying method.

2. Description of the Related Art

The existence of an event generated in a device within a processor system (computer system) is notified by a polling technique or the like, by an interrupt or a program that operates in the processor. The processor that is notified of the existence of the event acquires information related to the event by making an access such as read and write with respect to a register of the device, and executes a process corresponding to the generated event by an event handler. When a large number of events are generated, an oppression of a bus band associated with the acquisition of the information related to the events and a start overhead of the event handler become problems.

For example, a Japanese Laid-Open Patent Application No. 9-204311 proposes a first method of overcoming the above described problems, by preparing a shared memory that is shared by the device and the processor, and transferring the plurality of event information in one operation via the shared memory. However, the Japanese Laid-Open Patent Application No. 9-204311 does not mention a resource management of the shared memory.

In addition, in order to efficiently process a plurality of events by temporarily storing the event information in a storage unit such as the shared memory, it is necessary to cope with the problems associated with a cold input/output (I/O) where the event is not processed and abandoned for a long time and a hot input/output (I/O) where the interrupt is generated in excess.

For example, a Japanese Laid-Open Patent Application No. 7-262022 proposes a second method that temporarily stores the interrupts from the device by modifying an interrupt processing part of an Operating System (OS). This second method is additionally provided with a function (cold I/O countermeasure) of generating a software interrupt when there is an event that has not been processed for a predetermined time or longer, and a function (hot I/O countermeasure) of generating a software interrupt when the number of temporarily stored interrupts becomes a predetermined number or greater.

In order to overcome the problems of the oppression of the bus band associated with the acquisition of the event information and the start overhead of the event handler in the processor system having the device in which a large number of events are generated, it is effective to employ the first method which transfers the event information in one operation via the shared memory that is shared by the device and the processor. However, there is a problem in that the resource management of the shared memory must be carried out as a measure against overflow.

In order to efficiently notify the events, it is effective to employ the second method which modifies the interrupt processing part of the OS. However, there are problems in that an expensive operation is required to modify the OS and that the modification must be made for each OS.

On the other hand, if the process is concentrated in a specific processor of a multi-processor system, there is a problem in that the performance of the entire multi-processing system deteriorates. In other words, when the event handler is started in only the specific processor, the other processors cannot start their processes and must wait until the process of the event handler of the specific processor is completed. Accordingly, there are demands to realize a mechanism that would enable the event handler to be started in the other processors even when the event handler of the specific processor is started.

Among the events generated in the device, there is an event that cannot be notified via a queue. For example, an event that is generated in a state where the queue itself is unusable, cannot be notified via the queue. In addition, there is an event that does not need to be notified via the queue. An event that does not leave behind an effect because an error correction is carried out within the device, is one example of such an event that does not need to be notified via the queue. In the conventional system, the generation of these events are stored in a register of the device, however, there is a problem in that there is no means of knowing the times when these events were generated.

SUMMARY OF THE INVENTION

Accordingly, it is a general object of the present invention to provide a novel and useful event notifying method, device and processor system, in which the problems described above are suppressed.

Another and more specific object of the present invention is to provide an event notifying method, a device and a processor system, which can realize an event notification that processes a plurality of events in one interrupt without having to modify an OS by an expensive operation, cope with an inconsistent state of numbers of non-notified events, and distribute loads of processes of a multi-processor system.

Still another object of the present invention is to provide an event notifying method for notifying one or a plurality of events from a device to a processor by queuing to a queue in a processor system having one or a plurality of processors, comprising managing a number of non-notified events existing in the queue by a counter unit; and temporarily permitting an inconsistent state of the counter unit caused by differences in updating timings of the counter unit from the device and the processor. According to the event notifying method of the present invention, it is possible to realize an event notification that processes a plurality of events in one interrupt without having to modify an OS by an expensive operation, cope with an inconsistent state of numbers of non-notified events, and distribute loads of processes of a multi-processor system.

A further object of the present invention is to provide a device that generates one or a plurality of events with respect to one or a plurality of processors and notifies the same to the one or plurality of processor by queuing to a queue, comprising a managing part configured to manage a number of non-notified events existing in the queue by a counter unit; and a part configured to temporarily permit an inconsistent state of the counter unit caused by differences in updating timings of the counter unit from the device and each processor. According to the device of the present invention, it is possible to realize an event notification that processes a plurality of events in one interrupt without having to modify an OS by an expensive operation, cope with an inconsistent state of numbers of non-notified events, and distribute loads of processes of a multi-processor system.

Another object of the present invention is to provide a processor system comprising one or a plurality of processors; one or a plurality of devices configured to notify one or a plurality of events to each processor by queuing to a queue; and a counter unit configured to manage a number of non-notified events existing in the queue, wherein the counter unit temporarily permits an inconsistent state thereof caused by differences in updating timings of the counter unit from each device and each processor. According to the processor system of the present invention, it is possible to realize an event notification that processes a plurality of events in one interrupt without having to modify an OS by an expensive operation, cope with an inconsistent state of numbers of non-notified events, and distribute loads of processes of a multi-processor system.

Other objects and further features of the present invention will be apparent from the following detailed description when read in conjunction with the accompanying drawings.

DESCRIPTION OF THE PREFERRED EMBODIMENTS

A description will be given of embodiments of an event notifying method, a device and a processor system according to the present invention, by referring to the drawings.

In order to realize a flexible and efficient event information notification, it is effective to carry out a resource management with respect to a shared memory, and to carry out an interrupt control depending on a number of non-notified event information in the shared memory. In this specification, a "non-notified event" refers to the event that is stored in a queue and is not yet extracted from the queue.

It is conceivable to provide the resource management function and the interrupt control function with respect to the shared memory in a counter unit. But in this case, the counter unit must manage the non-notified event number and a vacant region in the shared memory, and a processor must notify the number of event information read from the shared memory to the counter unit. However, the writing of the event information to the shared memory, the increase in the number of non-notified event information due to the generation of events, and the decrease in the number of non-notified event information due to extraction of events by the processor, occur asynchronously, thereby causing an inconsistent state where the number of non-notified event information held in the counter unit becomes inconsistent. The present invention solves this problem of the inconsistent state where the number of non-notified event information held in the counter unit becomes inconsistent.

In other words, storing the events, updating the number of non-notified events, and processing by an event handler require respective processing times, and for this reason, the inconsistent state where the number of non-notified event information held in the counter unit becomes inconsistent occurs. In order to solve this problem of the inconsistent state, the present invention permits, with respect to the number of non-notified event information managed by the counter unit, a state where the total number of notified events is larger than the total number of generated events.

As a method of managing the non-notified events, it is possible to employ a method of storing the total number of generated and notified events or, a method of holding in the counter unit the number of non-notified events in the queue.

According to the method of storing the total number of generated and notified events, the non-notified events are managed by the counter unit, by incrementing the total number of events by "+1" when an event is generated, and incrementing the total number of notified events by "+1" with respect to one event extracted by the processor. In the inconsistent state, the total number of generated events becomes smaller than the total number of notified events, but this is only a temporary state, and a normal state will be resumed when the total number of generated events is updated.

According to the method holding in the counter unit the number of non-notified events in the queue, the non-notified events are managed by the counter unit, by incrementing a counted value of the counter unit by "+1" when an event is generated, and decrementing the counted value of the counter unit by "−1" with respect to one event extracted by the processor. In the inconsistent state, the counted value of the counter unit takes a negative value, but this is only a temporary state, and a normal state will be resumed when the counted value increases with the generation of events.

With respect to the concentration of the load in the multi-processor system, measures are taken so that it is possible to set in advance a plurality of processors that are to be notified, and the notifying destination is changed according to a suitable algorithm upon completion of the notification. In addition, a plurality of queues are provided, and the processors that are to process the events are grouped into blocks, so as to improve the scalability by parallel processing.

As for the event that cannot be notified via the queue or, the event that does not need to be notified, detailed information of such an event is stored within the device, for example, and a flag indicating the generation of such an event is added to the event information that is stored in the queue. As a result, it is possible to know the time when the event was generated.

Figure 1:
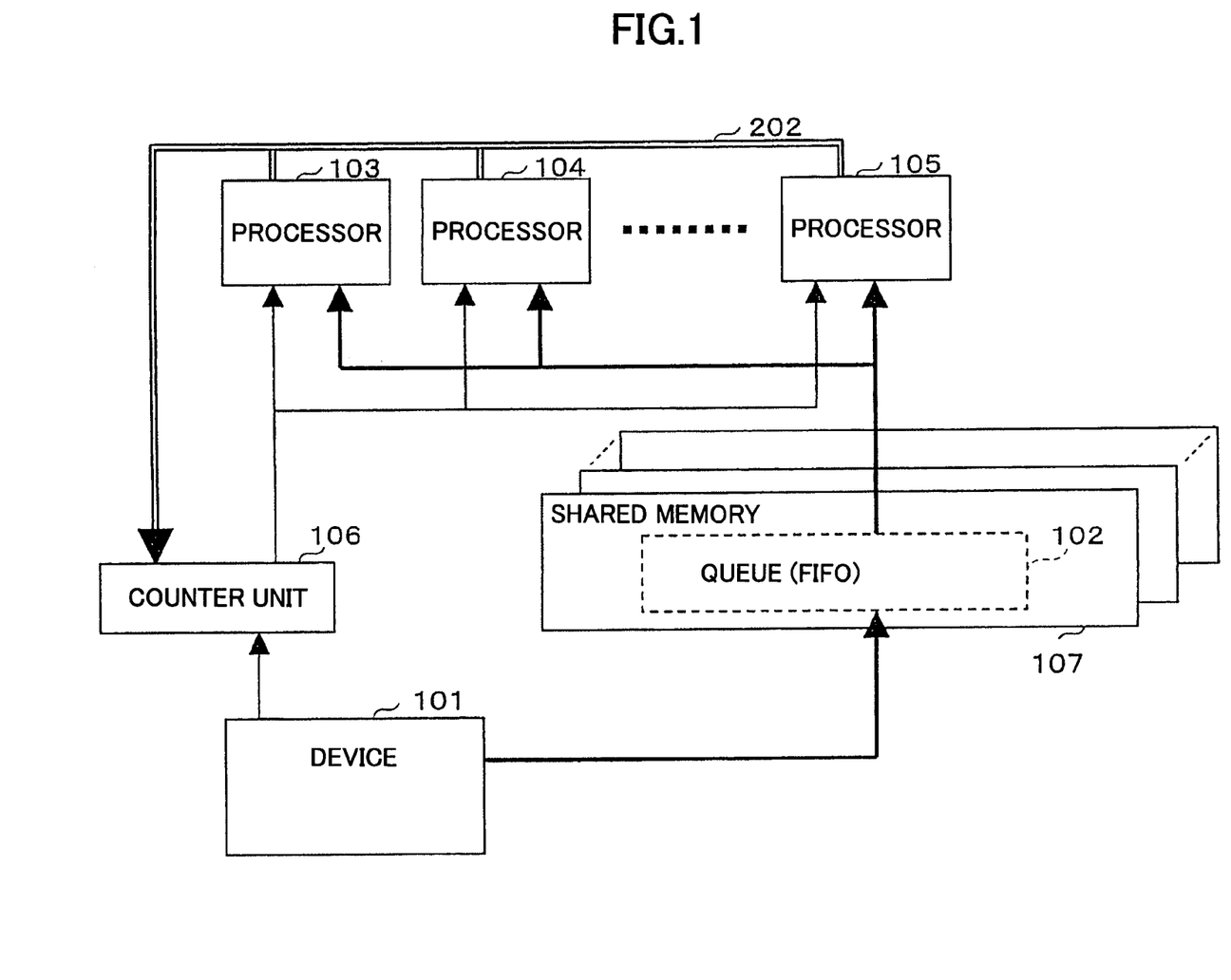
FIG. 1 is a system block diagram showing a first embodiment of a processor system according to the present invention.

FIG. 1 is a system block diagram showing a first embodiment of a processor system according to the present invention. This first embodiment of the processor system employs a first embodiment of an event notifying method according to the present invention and a first embodiment of a device according to the present invention. In this first embodiment, the present invention is applied to a multi-processor system.

The processor system shown in FIG. 1 includes a device 101, one or a plurality of processors 103, 104 and 105 for processing events from the device 101, a counter unit 106 and a shared memory 107. A system bus 202 connects the processors 103, 104 and 105 and the counter unit 106. The device 101 and the processors 103, 104 and 105 share a queue 102 within the shared memory 107. The counter unit 106 manages the number of events existing in the queue 102. The device 101 writes the event to the queue 102, and each of the processor 103, 104 and 105 reads the event from the queue 102. The device 101 writes the generated events into the queue 102 in the generated order, and each of the processors 103, 104 and 105 reads the events from the queue 102 in the written order, that is, in the generated order, so as to carry out a corresponding event process. The device 101 notifies the number of events that are written to the counter unit 106. The counter unit 106 generates an interrupt to each of the processors 103, 104 and 105, so as to notify that the events exist in the queue 102. In order to update the number of non-notified events managed by the counter unit 106, each of the processors 103, 104 and 105 notifies the number of notified events by a method such as writing the number of notified events to a register of the counter unit 106.

Figure 2:
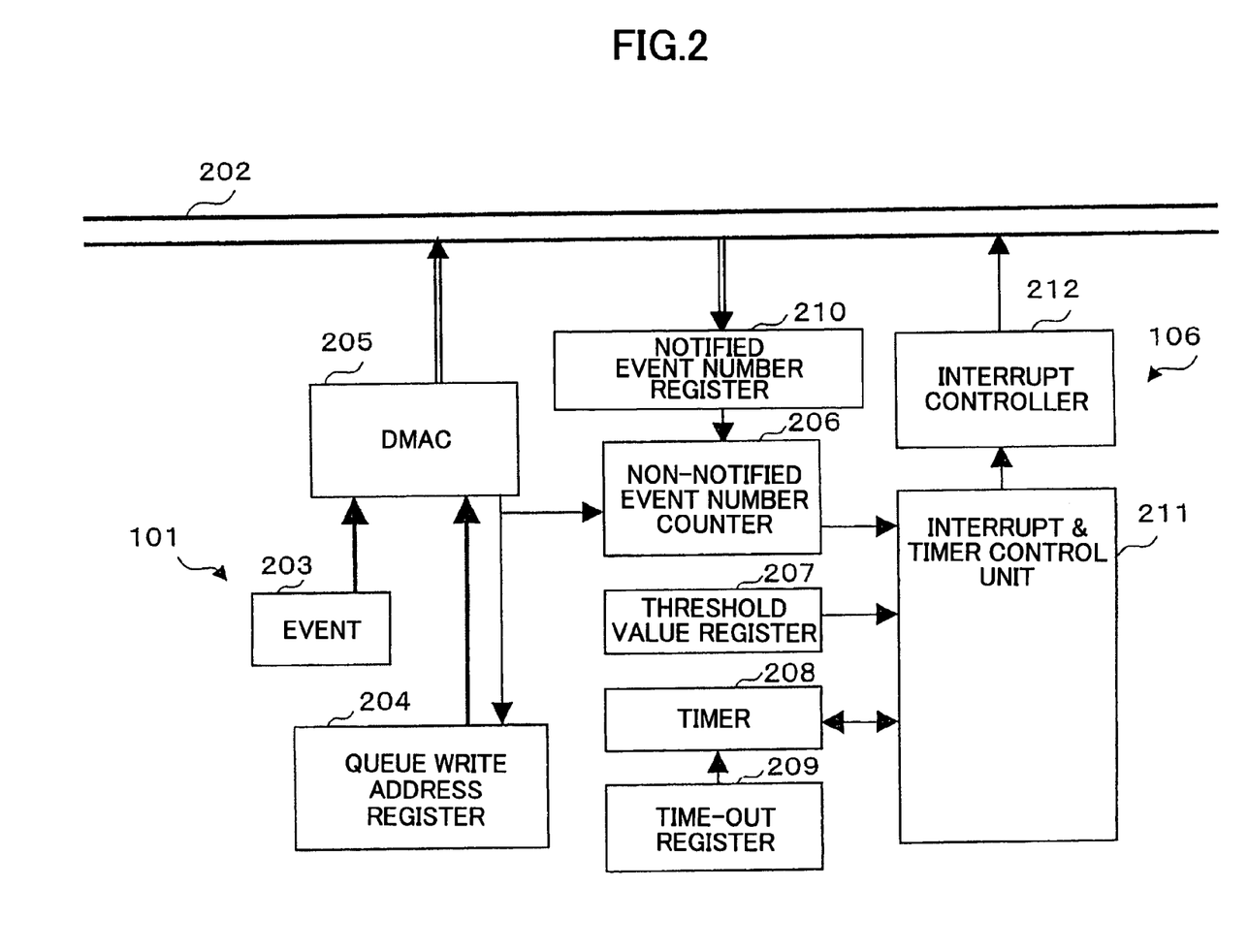
FIG. 2 is a system block diagram showing an event notifying mechanism of a device.

FIG. 2 is a system block diagram showing an event notifying mechanism of the device 101. In FIG. 2, it is assumed for the sake of convenience that the queue 102 exists in the shared memory 107 (or a main storage) outside the device 101, and that the event is written into the queue 102 by a Direct Memory Access Controller (DMAC) 205. The device 101 includes an event 203, a queue write address register 204 and the DMAC 205. The counter unit 106 includes a non-notified event number counter 206, a threshold value register 207, a timer 208, a time-out register 209, a notified event number register 210, an interrupt and timer control unit 211, and an interrupt controller 212.

The counter unit 106 may be provided within the device 101. In this case, the device 101 is made of an expansion board or substrate such as a Peripheral Component Interconnect (PCI), and the counter unit 106 is provided on this expansion board or substrate.

The event 203 generates data to be stored into the queue 102 corresponding to the generated event 203. A next write address of the queue 102 is stored in the queue write address register 204 for the queue 102. The DMAC 205 writes the event 203 into the queue 102. In this embodiment, the number of non-notified events is held in the non-notified event number counter (register) 206 which may take a negative counted value. The threshold value register 207 holds a threshold value which may be set and changed from the outside. More particularly, the threshold value register 207 holds the threshold value of the number of events 203 which generate an interrupt. The timer 208 measures the time until the interrupt is generated. The time-out register 209 holds the time until the interrupt is generated, that is measured by the timer 208. The interrupt and timer control unit 211 compares the values in the non-notified event number counter 206, the threshold value register 207 and the timer 208, and controls the starting and stopping of the timer 208 and the generation of the interrupt based on the compared result. The interrupt controller 212 holds a plurality of interrupt destinations, and generates the interrupt to the present interrupt destination when the interrupt is generated, and updates the interrupt destination when the generation of the interrupt is stopped. The notified event number register 210 is used by the processors 103, 104 and 105 to write the notified event number (that is, the number of notified events).

When the event 203 is generated within the device 101, the data corresponding to the event 203 are created and sent to the DMAC 205 together with the value of the queue write address register 204 for the queue 102. The DMAC 205 writes the event 203 into the queue 102. When the Direct Memory Access (DMA) is completed, the counted value in the non-notified event number counter 206 is incremented by "+1", and the write address to the queue 102 is updated to the next write address. The number of notified events in the processor 103, 104 or 105 is written in the notified event number register 210, and subtracted from the counted value of the non-notified event number counter 206. The interrupt and timer control unit 211 makes a reference to the counted value of the non-notified event number counter 206, the threshold value register 207 and the timer 208, and carries out an interrupt control and makes a setting with respect to the timer 208. When the interrupt control from the interrupt and timer control unit 211 makes a transition from a non-generated state to a generated state, the interrupt controller 212 generates an interrupt with respect to the processor 103, 104 or 105 at the interrupt destination. On the other hand, when the interrupt control from the interrupt and timer control unit 211 makes a transition from the generated state to the non-generated state, the interrupt controller 212 stops the interrupt and determines the next interrupt destination from the processor 103, 104 or 105 at the interrupt destination according to an algorithm (or system) such as round-robin.

Accordingly, the notifying destination can be changed according to a suitable algorithm such as the round-robin, during a time period from the time when the non-notified event number is changed and the notification is completed until the time when the next notification is made to the processor 103, 104 or 105, so that the load will not be concentrated on a specific processor. The processor 103, 104 or 105 which is notified of the event may carry out an exclusive process when extracting the event from the queue 102.

Figure 3:
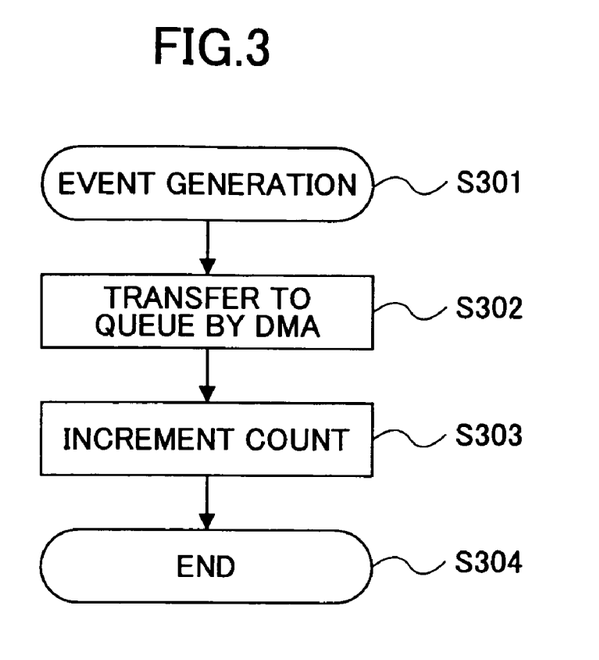
FIG. 3 is a flow chart for explaining an operation of a DMAC.
Figure 4:
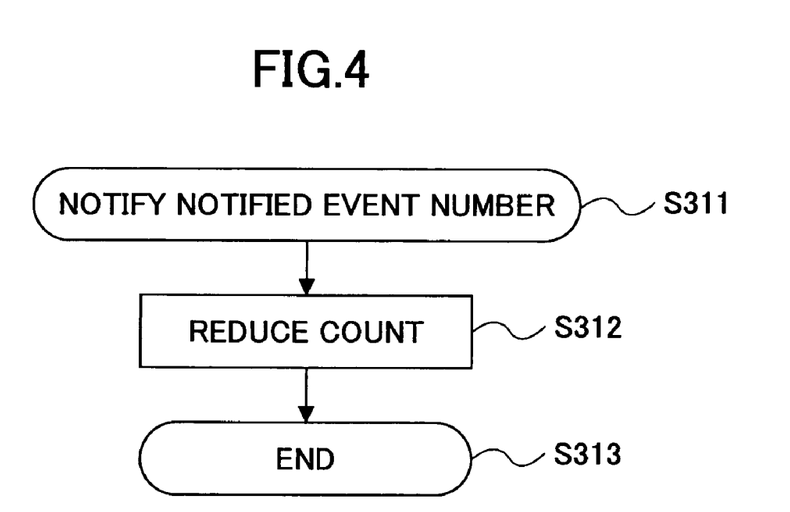
FIG. 4 is a flow chart for explaining an operation of a non-notified event number counter.
Figure 5:
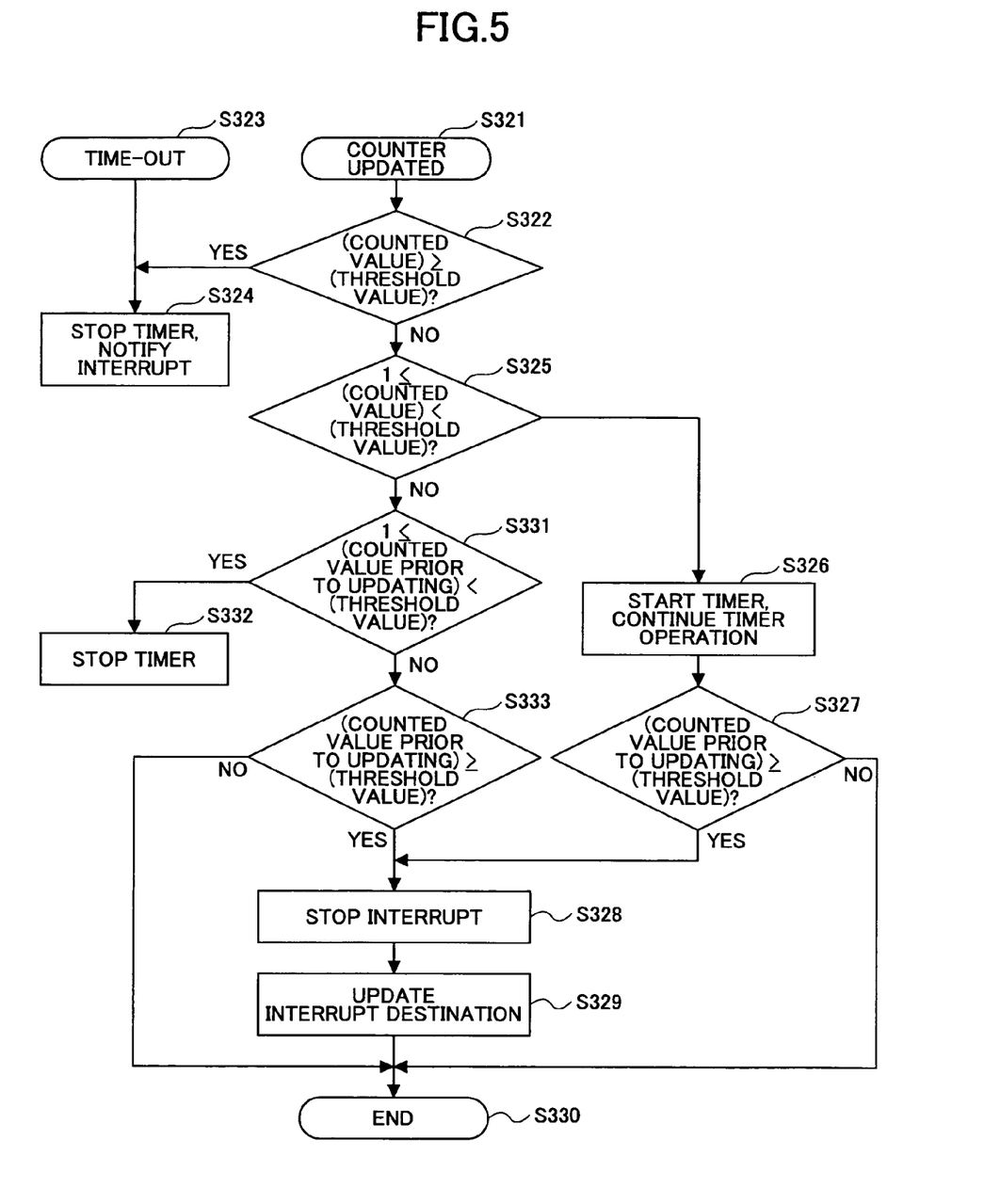
FIG. 5 is a flow chart for explaining an operation of an interrupt and timer control unit.

FIGS. 3, 4 and 5 are flow charts for explaining an operation of the non-notified event number counter 206 and an interrupt generating condition.

FIG. 3 is a flow chart for explaining an operation of the DMAC 205. In FIG. 3, when the event 203 is generated in a step S301, the DMAC 205 writes the event 203 into the queue 102 in a step S302. When the writing of the event 203 is completed, the DMAC 205 increments the counted value of the non-notified event number counter 206 by "+1" in a step S303, and the process ends in a step S304.

FIG. 4 is a flow chart for explaining an operation of the non-notified event number counter 206. In FIG. 4, when the processor 103, 104 or 105 carries out an event process in a step S311, the processor 103, 104 or 105 writes the notified event number in the notified event number register 210, so as to notify the notified event number to the device 101. The non-notified event number counter 206 subtracts the notified event number written in the event number register 210 from the counted value of the non-notified event number counter 206 in a step S312, and the process ends in a step S313.

FIG. 5 is a flow chart for explaining an operation of the interrupt and timer control unit 211. In FIG. 5, when the interrupt and timer control unit 211 detects in a step S321 that the counted value of the non-notified event number counter 206 has been updated by the incrementing or subtraction in FIG. 3 or 4, the interrupt and timer control unit 211 compares the counted value of the non-notified event number counter 206 and the threshold value in the threshold value register 207 in a step S322 so as to decide whether or not the counted value is greater than or equal to the threshold value. The process advances to a step S324 if the decision result in the step S322 is YES. On the other hand, when the interrupt and timer control unit 211 detects in a step S323 that the non-notified event number counter 206 is maintaining the same state for a predetermined time after the counted value of the non-notified event number counter 206 changed to a value that is greater than or equal to 1 and less than the threshold value, by a time-out of the timer 208 based on the time held in the time-out register 209, the process advances to the step S324. The step S324 stops the timer 208, and notifies the interrupt controller 212 that an interrupt has been generated.

If the decision result in the step S322 is NO, a step S325 decides whether or not the counted value of the non-notified event number counter 206 that has been incremented or subtracted is greater than or equal to 1 and less than the threshold value. If the decision result in the step S325 is YES, a step S326 starts the timer 208 if in a stopped state, and continues the operation of the timer 208 if in an operating state. A step S327 decides whether or not the counted value of the non-notified event number counter 206 prior to the updating is greater than or equal to the threshold value, and the process ends if the decision result in the step S327 is NO. If the decision result in the step S327 is YES, a step S328 notifies the non-generation of the interrupt to the interrupt controller 212, and the interrupt is stopped. In addition, a step S219 updates the interrupt destination, and the process ends.

On the other hand, if the decision result in the step S325 is NO, a step S331 decides whether or not the counted value of the non-notified event number counter 206 prior to the updating is greater than or equal to 1 and less than the threshold value. If the decision result in the step S331 is YES, a step S332 stops the timer 208. If the decision result in the step S331 is NO, a step S333 decides whether or not the counted value of the non-notified event number counter 206 prior to the updating is greater than or equal to the threshold value, and the process ends if the decision result in the step S333 is NO. If the decision result in the step S333 is YES, a step S328 notifies the non-generation of the interrupt to the interrupt controller 212, and stops the interrupt. In addition, a step S329 updates the interrupt destination, and the process ends.

Figure 6:
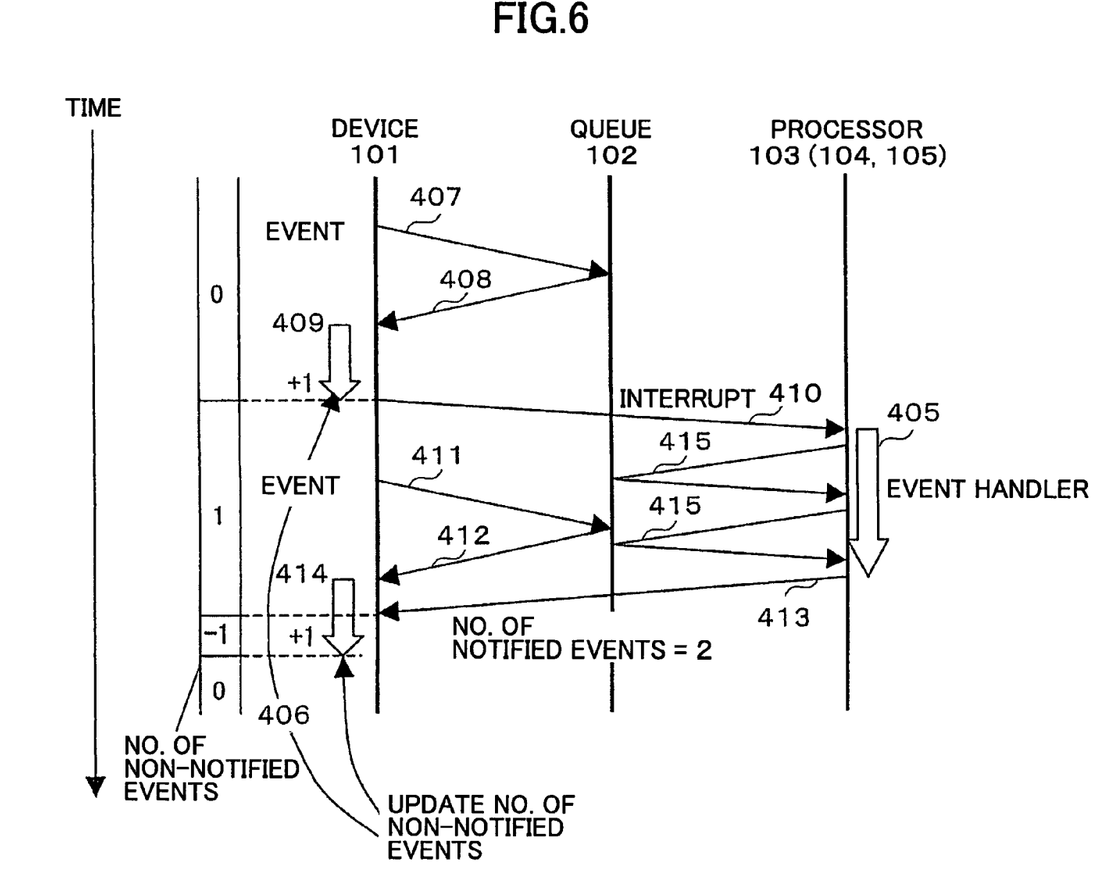
FIG. 6 is a time chart for explaining a change in a counted value of the non-notified event number counter.

Next, a description will be given of the process by which the non-notified event number information held in the counter unit 106 becomes inconsistent, by referring to FIG. 6. FIG. 6 is a time chart for explaining a change in the counted value of the non-notified event number counter 206. In the following description, it is assumed for the sake of convenience that the queue 102 is created in the shared memory 107, the device 101 writes the event information with respect to the queue 102, and the processor 103, 104 or 105 extracts the event information from the queue 102. The counter unit 106 stores the non-notified event number.

In a real machine such as a multi-processor system, the storage of the event 203 into the queue 102 is made by a process which starts with the writing to the shared memory 107 storing the queue 102 until a write complete notification is received. Thereafter, a process of updating the non-notified event number is carried out. It takes a certain time until the write complete notification is received after the writing to the shared memory 107 starts, and it takes a certain time until the non-notified event number is updated after receipt of the write complete notification. In addition, the event handler that is started by an interrupt or the like (hereinafter referred to as a notification to the processor 103, 104 or 105) carries out the event process and notifies the acquired event number to the counter unit 106 at various timings.

For the sake of convenience, FIG. 6 shows a case where 2 events 407 and 411 are generated in the device 101, and there are 2 event write and write complete notifications 408 and 412 with respect to the queue 102 and 2 non-notified event number updates 409 and 414. Moreover, it is assumed that the processor 103, 104 or 105 carries out an event process 405 of the event handler and a notified event number notification 413.

When an interrupt 410 is generated by the event 407, the event process 405 of the event handler is started. While the event process 405 is being started, the event 411 is further generated and written into the queue 102. The event handler carries out an event extraction (or acquisition) 415, but after the first event process, the second event exists in the queue 102, and thus, a total of 2 events 407 and 411 are processed. For this reason, the write complete notification 412 for the event 411 reaches the device 101, and the notified event number notification 413 from the event handler reaches the device 101 before the execution of the non-notified event number updating 414 is completed. Hence, an impossible state is generated where the number of non-notified events (non-notified event number) is smaller than the number of notified events (notified event number) or, the total number of generated events (generated total event number) is smaller than the total number of notified events (notified total event number). This impossible state is generated when a non-notified event number 406 is "−1". In a processor system which does not anticipate such an impossible state, an erroneous operation will be carried out due to this underflow of the counter unit 106.

But in this embodiment, the event write and write complete notification 408 with respect to the queue 102 and the non-notified event number updating 409 are carried out in response to the event 407, and the non-notified event number 406 is incremented by "+1" from "0" to "1". Accordingly, if the threshold value is "1", the interrupt 410 is generated. The event handler is started in the processor 103, 104 or 105 in response to the interrupt 410. The event 411 is generated and the event write 412 with respect to the queue 102 while the event process 405 of the event handler is being started. The event handler carries out the event extraction 415 with respect to the queue 102, but after the first event process, the second event exists in the queue 102, and thus, a total of 2 events 407 and 411 are processed. For this reason, the write complete notification 412 for the event 411 reaches the device 101, and the notified event number notification 413 from the event handler reaches the device 101 before the execution of the non-notified event number updating 414 is completed. The non-notified event number 406 changes from "1" to "−1". When the non-notified event number updating 414 ends with respect to the event 411, the non-notified event number 406 is incremented by "+1" from "−1" to "0".

In FIG. 6, the non-notified event number 406 represents a value that is obtained by subtracting the notified total event number from the generated total event number or, the counted value of the non-notified event number. By representing a state where the notified total event number becomes larger than the generated total event number by a negative value in FIG. 6, the non-notified event number 406 temporarily takes the negative value "−1", which is an impossibility, but the non-notified event number 406 is returned to the normal state by the non-notified event number updating 414.

The writing of the event information to the shared memory 107, the increase in the number of non-notified event information due to the generation of events, and the decrease in the number of non-notified event information due to extraction of events by the processor 103, 104 or 105, occur asynchronously, thereby causing the inconsistent state where the number of non-notified event information held in the counter unit 106 becomes inconsistent. But this embodiment can solve this problem of the inconsistent state where the number of non-notified event information held in the counter unit 106 becomes inconsistent.

Figure 7:
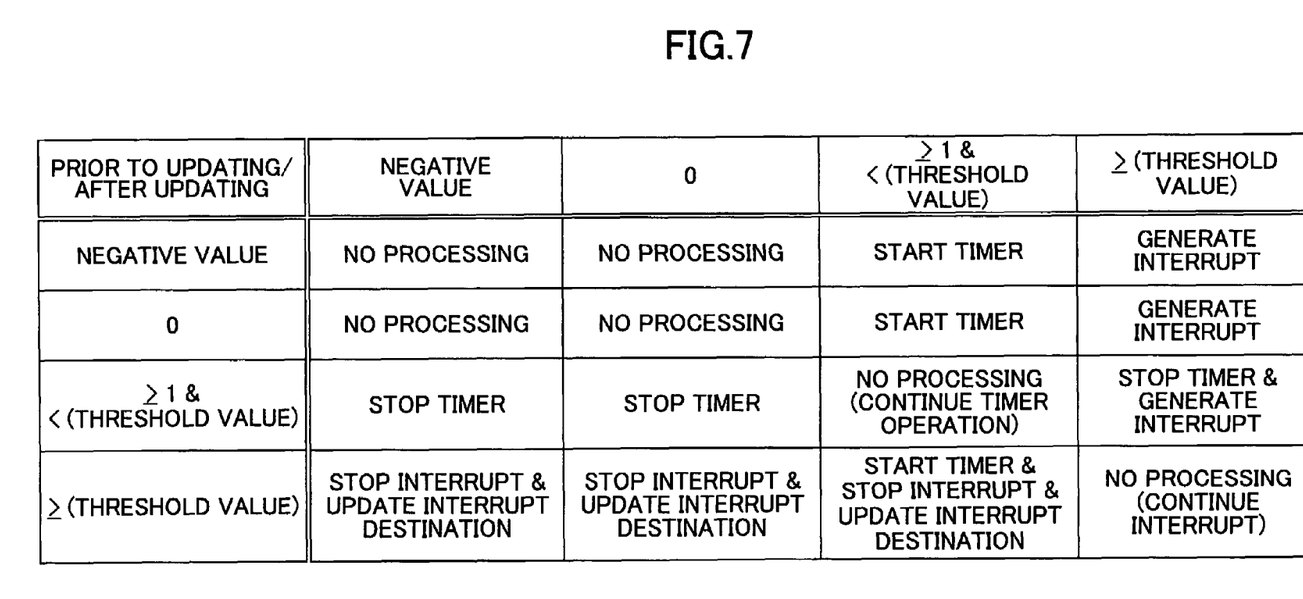
FIG. 7 is a diagram showing a relationship of an increase in the counted value due to generation of events, a decrease in the counted value due to notification of a number of processed events, an interrupt generating condition and an updating of an interrupt destination.

FIG. 7 is a diagram showing a relationship of the increase in the counted value due to generation of events, the decrease in the counted value due to notification of the number of processed events, the interrupt generating condition and the updating of the interrupt destination. The counted value of the non-notified event number counter 206 takes one of 4 states, namely, a negative value, zero ("0"), greater than or equal to 1 and less than the threshold value, and greater than or equal to the threshold value. The interrupt is generated in the case where the counted value after the updating becomes greater than or equal to the threshold value. The timer 208 is started in the case where the counted value after the updating becomes greater than or equal to 1 and less than the threshold value. In the case where the counted value is greater than or equal to the threshold value prior to the updating but no longer satisfies this condition after the updating, the interrupt is stopped, and the interrupt destination is updated. In the case where the counted value is greater than or equal to 1 and less than the threshold value prior to the updating but no longer satisfies this condition after the updating, the timer 208 is stopped.

Figure 8:
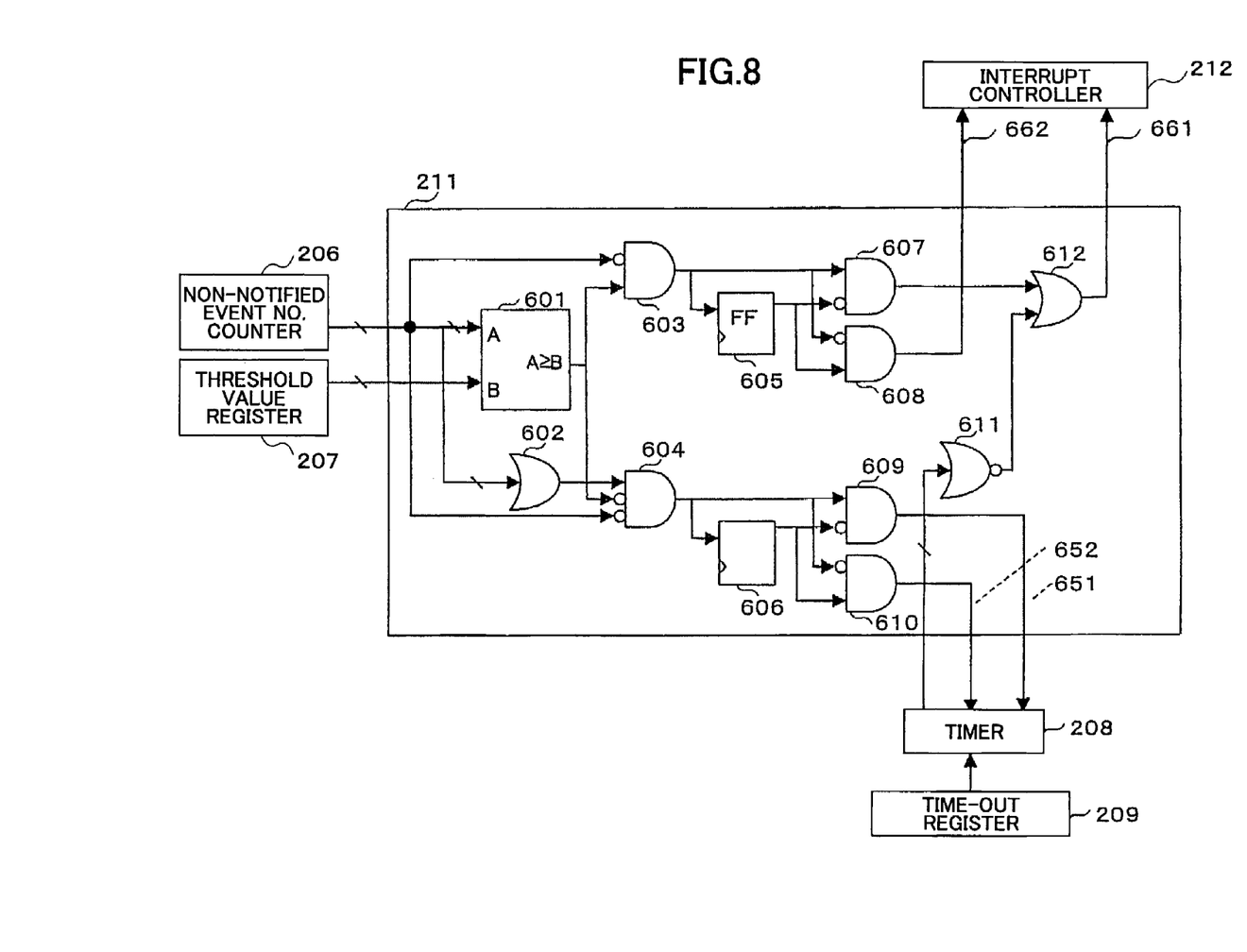
FIG. 8 is a circuit diagram showing the interrupt and timer control unit shown in FIG. 2.

FIG. 8 is a circuit diagram showing the interrupt and timer control unit 211 shown in FIG. 2. It is assumed for the sake of convenience that, as peripheral modules of the interrupt and timer control unit 211, the non-notified event number counter 206 is formed by an integer register with sign, and the threshold value register 207 is formed by a register that holds a positive integer. In addition, it is assumed for the sake of convenience that the timer 208 is formed by a down-counter which reduces a time value thereof for every predetermined time, and that an initial value of the timer 208, which is a positive value, is stored in the time-out register 209. A negative sign flag (1 bit) of the non-notified event number (counted value) output from the non-notified event number counter 206 is input to AND circuits 603 and 604.

The timer 208 reads the initial value from the time-out register 209 when a timer start signal 651 changes from "0" to "1", to start a down-count of the timer value, and stops the down-count when the timer value becomes "0". When a timer stop signal 652 changes from "0" to "1", the timer value is set to the initial value and the timer stops 208, regardless of whether the timer 208 is operating or is stopped. A timer stop signal 652 has priority over the timer start signal 651. The interrupt controller 212 starts an interrupt when an interrupt start signal 661 changes from "0" to "1", and stops the interrupt when an interrupt stop signal 662 changes from "0" to "1", and changes the interrupt destination if necessary. An integer value with sign from the non-notified event number counter 206, a positive integer value from the threshold value register 207 and a present timer value from the timer 208 are used as external inputs to the interrupt and timer control unit 211. The timer start signal 651 and the timer stop signal 652 to the timer 208, and the interrupt start signal 661 and the interrupt stop signal 662 to the interrupt controller 212 are used as external outputs from the interrupt and timer control unit 211.

In FIG. 8, a comparing and computing unit 601 compares the counted value of the non-notified event number counter 206 and the threshold value of the threshold value register 207. An output signal of the comparing and computing unit 601 becomes "1" if the counted value is greater than or equal to the threshold value. If the counted value is not a negative value and the output signal of the comparing and computing unit 601 is "1", and an output signal of the AND circuit 603 becomes "1" which is greater than or equal to the threshold value. On the other hand, due to an output signal "1" of an OR circuit 602, if the counted value is other than "0" and is not a negative value and is less than the threshold value, the counted value is greater than or equal to "1" and less than the threshold value, so that an output signal of the AND circuit 604 becomes "1". Flip-flop circuits 605 and 606 respectively store the previous state for counted value greater than or equal to the threshold value and the counted value greater than or equal to "1" and less than the threshold value. AND circuits 607 and 608 detect a change from the state less than the threshold value to the state greater than or equal to the threshold value (interrupt start), and a change from the state greater than or equal to the threshold value to another state (interrupt stop). AND circuits 609 and 610 detect a change from the state other than greater than or equal to "1" and less than the threshold value to the state greater than or equal to "1" and less than the threshold value (timer start), and a change from the state greater than or equal to "1" and less than the threshold value to another state (timer stop). In addition, the time-out is detected by a NOR circuit 611, and is output to the interrupt controller 212 together with the interrupt from an OR circuit 612 for the state greater than or equal to the threshold value.

Figure 9:
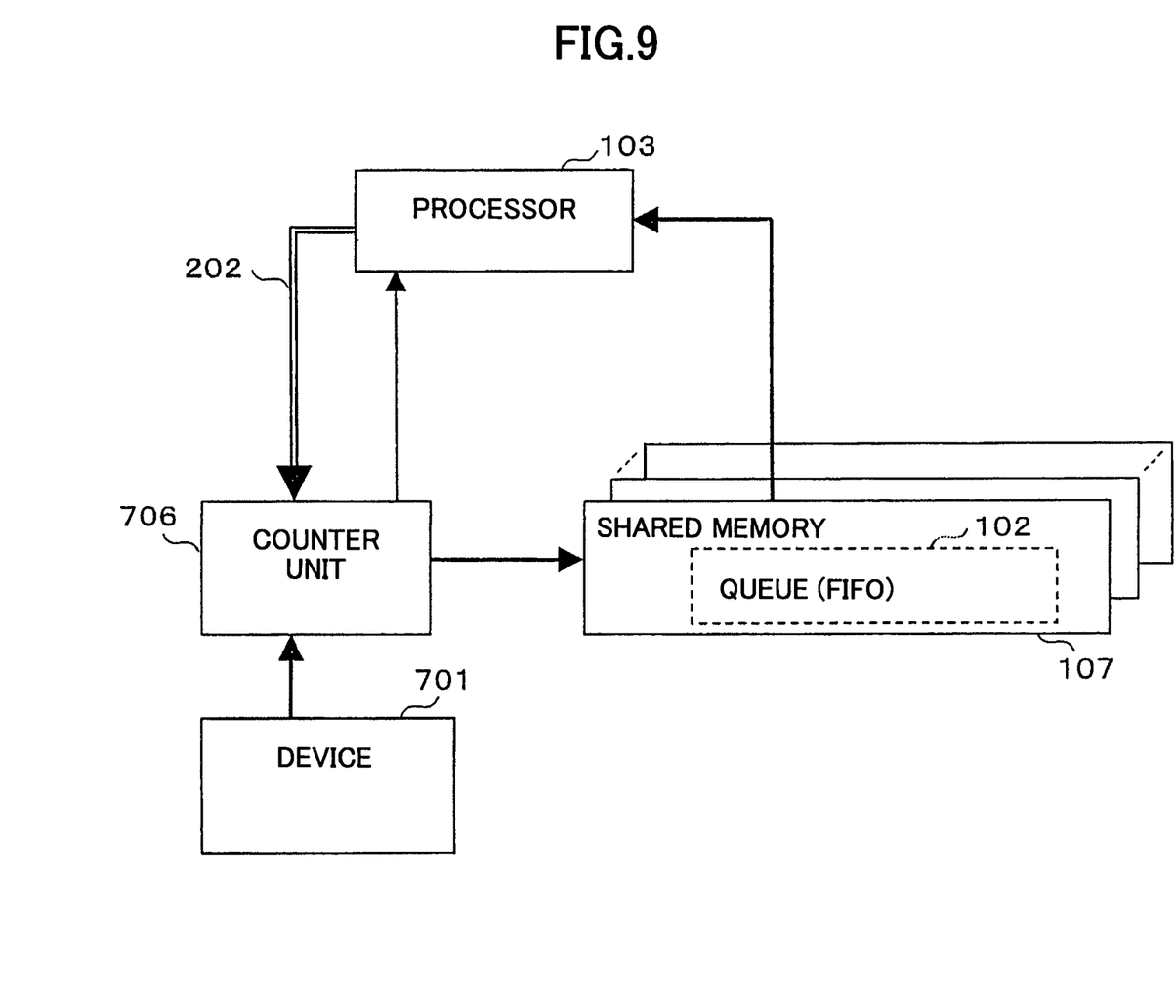
FIG. 9 is a system block diagram showing a second embodiment of the processor system according to the present invention.

FIG. 9 is a system block diagram showing a second embodiment of the processor system according to the present invention. This second embodiment of the processor system employs a second embodiment of the event notifying method according to the present invention and a second embodiment of the device according to the present invention. Only 1 processor is shown in FIG. 9, but it is of course possible to provide a plurality of processors as in the case of the first embodiment shown in FIG. 1. In FIG. 9, those parts which are the same as those corresponding parts in FIG. 1 are designated by the same reference numerals, and a description thereof will be omitted.

In this embodiment, an event write function is added to a counter unit 706, and a device 701 notifies only the generated event to the counter unit 706. In other words, the device 701 includes the event 203 shown in FIG. 2. On the other hand, the counter unit 706 includes the queue write address register 204, the DMAC 205, the non-notified event number counter 206, the threshold value register 207, the timer 208, the time-out register 209, the notified event number register 210, the interrupt and timer control unit 211, and the interrupt controller 212 shown in FIG. 2.

The counter unit 706 may be provided within the device 701. In this case, the device 701 is made of an expansion board or substrate such as a PCI, and the counter unit 706 is provided on this expansion board or substrate.

Figure 10:
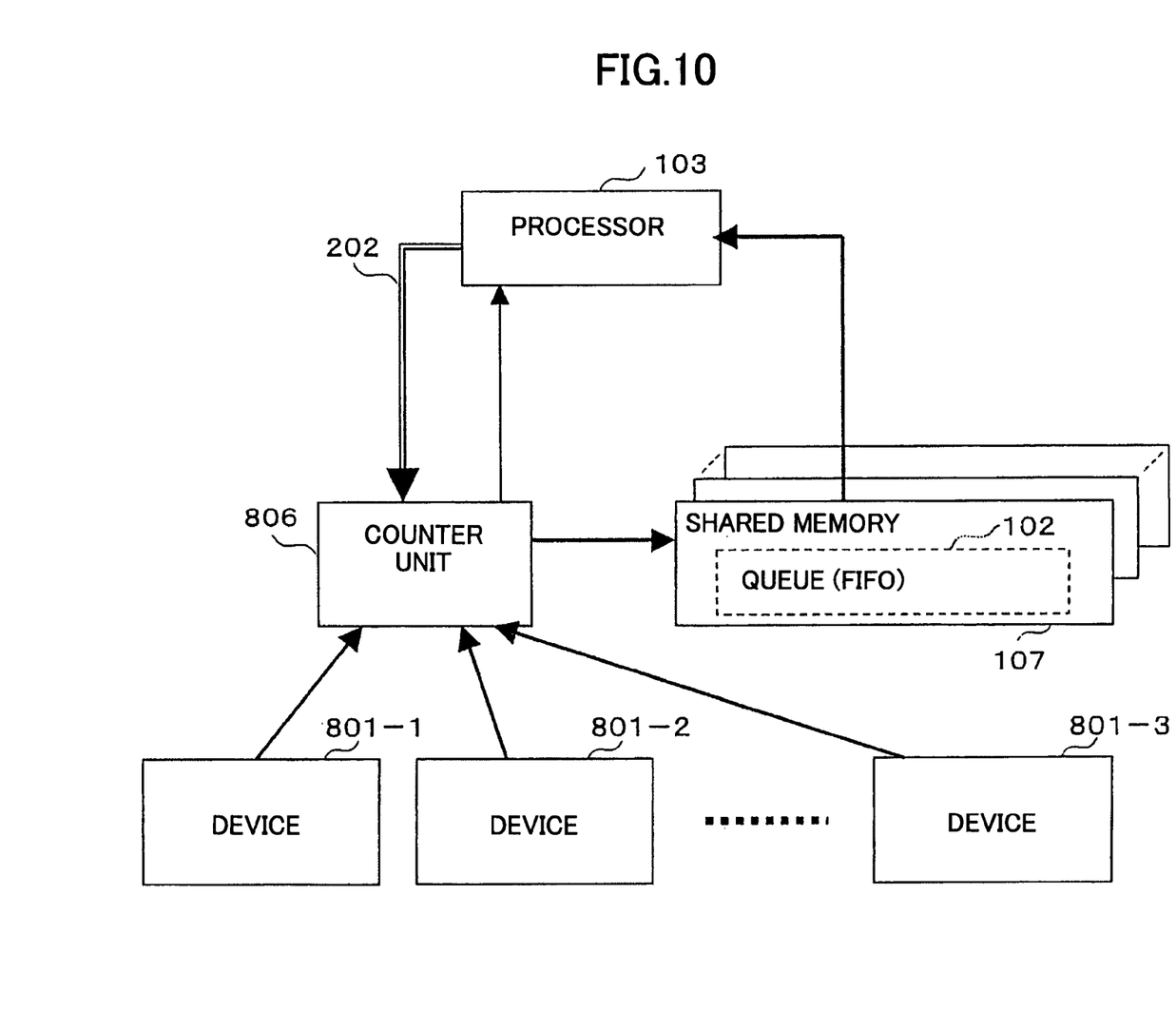
FIG. 10 is a system block diagram showing a third embodiment of the processor system according to the present invention.

FIG. 10 is a system block diagram showing a third embodiment of the processor system according to the present invention. This third embodiment of the processor system employs a third embodiment of the event notifying method according to the present invention and a third embodiment of the device according to the present invention. Only 1 processor is shown in FIG. 10, but it is of course possible to provide a plurality of processors as in the case of the first embodiment shown in FIG. 1. In FIG. 10, those parts which are the same as those corresponding parts in FIG. 1 are designated by the same reference numerals, and a description thereof will be omitted.

In this embodiment, a counter unit 806 receives events from a plurality of devices 800-1, 800-2 and 800-3, as shown in FIG. 10. In other words, each of the devices 800-1, 800-2 and 800-3 includes the event 203 shown in FIG. 2. On the other hand, the counter unit 806 includes the queue write address register 204, the DMAC 205, the non-notified event number counter 206, the threshold value register 207, the timer 208, the time-out register 209, the notified event number register 210, the interrupt and timer control unit 211, and the interrupt controller 212 shown in FIG. 2.

The counter unit 806 may be provided within each of the devices 801-1, 800-2 and 800-3. In this case, each of the devices 800-1, 800-2 and 800-3 is made of an expansion board or substrate such as a PCI, and the counter unit 806 is provided on this expansion board or substrate.

As a modification of any of the first through third embodiments described above, it is possible to further provide the queue 102 within the devices 101, 701 and 801-1 through 801-3 that are formed by an expansion board or substrate. In this case, a plurality of queues may be provided in one device, and independent events may be treated by each of the queues. As a result, it is possible to separate the processors to which the events are notified, and improve the parallel processing performance of the processor system.

Figure 11:
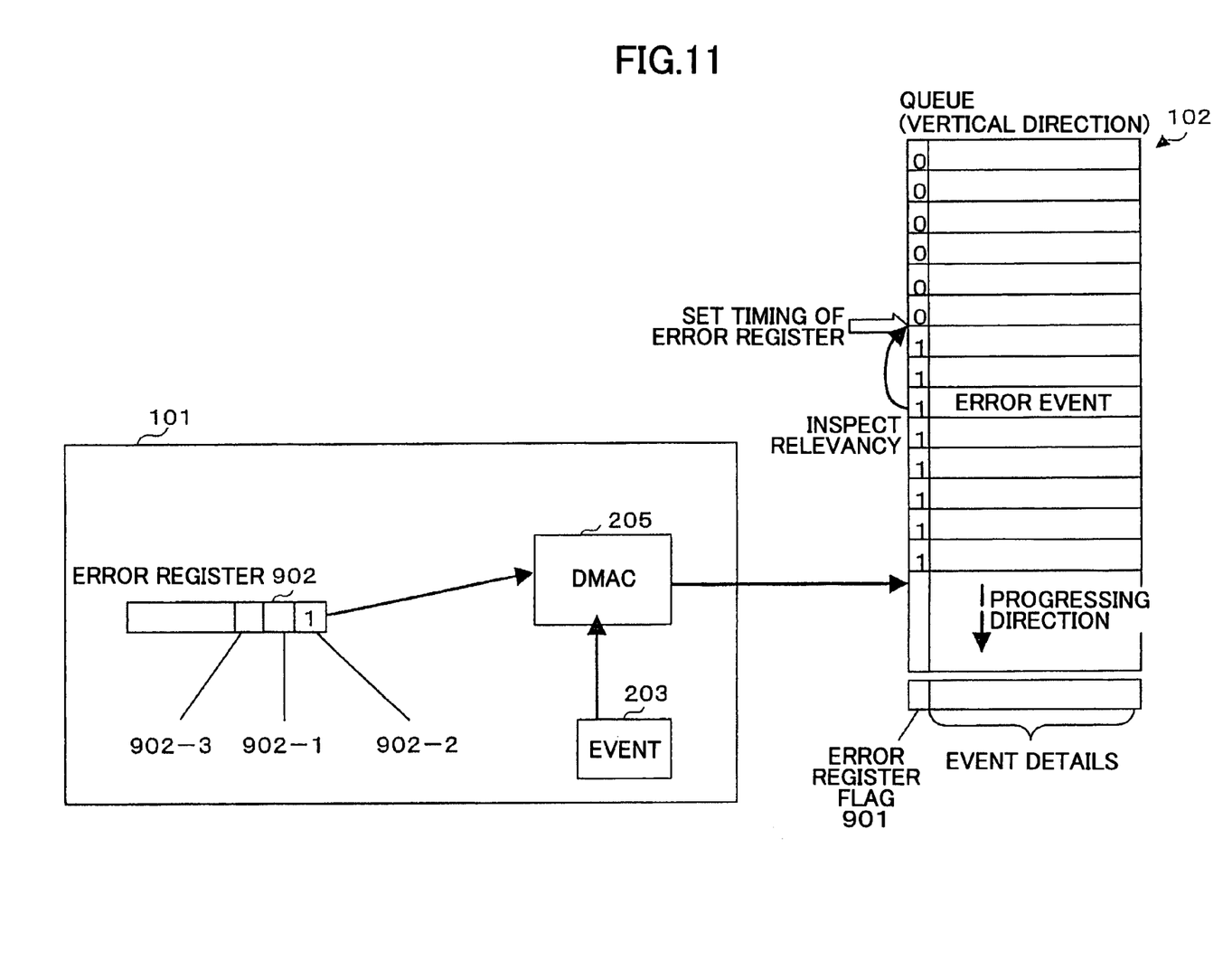
FIG. 11 is a system block diagram showing a fourth embodiment of the processor system according to the present invention.

FIG. 11 is a system block diagram showing a fourth embodiment of the processor system according to the present invention. This fourth embodiment of the processor system employs a fourth embodiment of the event notifying method according to the present invention and a fourth embodiment of the device according to the present invention. In FIG. 11, those parts which are the same as those corresponding parts in FIG. 1 are designated by the same reference numerals, and a description thereof will be omitted.

In this embodiment, 1 bit 901 of the data of the event 203 stored in the queue 102 is used as a valid information flag of an error register 902 of the device 101. The error register 902 holds error information such as a DMA error 902-1, a queue overrun 902-2 and internal RAM parity error 902-3, and a corresponding bit is set when the event 203 is generated.

The processor 103, 104 or 105 reads the event 203 of the queue 102, and checks the contents of the error register 902 if the valid information flag 901 is set. Accordingly, if one or a plurality of events are lost due to the queue overrun 902-2 or the like, such loss of the events can be detected. In addition, if an error event is read from the queue 102, there is a possibility that the error register 902 stores the error information of the event that was not notified by a previously generated queue, and this error information can be effectively utilized for analysis and the like when a system failure occurs, for example.

This fourth embodiment can of course be applied to the second embodiment or the third embodiment.

Therefore, according to this fourth embodiment, it is possible to time-sequentially store the generation of events by storing the error information in the error register 902 when an event that cannot be notified through the queue or an event that does not need to be notified is generated. Hence, the processor that extracts the event can acquire the generated event, inclusive of the non-notified event, based on the error information of the error flag that is added to the event. In addition, when the analysis and the like are made when the system failure occurs, for example, it is possible to know the exact timing when the event was generated.

Further, the present invention is not limited to these embodiments, but various variations and modifications may be made without departing from the scope of the present invention.

What is claimed is:

1. An event notifying method comprising:
   notifying one or a plurality of events from a device to a processor by storing said one or plurality of events in a queue in a processor system having one or a plurality of processors;
   managing a number of non-notified events existing in the queue by a counter unit which is incremented when an event is generated and is decremented with respect to an event that is extracted from the queue by the processor, said non-notified events being the events that are stored in the queue but are not yet extracted from the queue; and
   controlling a time of notifying the processor, including temporarily permitting a negative value of the counter unit as an inconsistent state of the counter unit caused by differences in updating timings of the counter unit from the device and the processor until updating of the counter unit to resume a normal state of the counter unit, according to the updating state of the counter unit and one or more value states of the counter unit including the negative value.

2. The event notifying method as claimed in claim 1, wherein a notifying condition to the processor is when the number of non-notified events is greater than or equal to a threshold value.

3. The event notifying method as claimed in claim 2, comprising:
   suppressing notification to the processor for a certain time from a time when the notifying condition is no longer satisfied.

4. The event notifying method as claimed in claim 1, wherein a notifying condition to the processor is when a non-notified event exists for a predetermined time or longer.

5. The event notifying method as claimed in claim 4, comprising:
   suppressing notification to the processor for a certain time from a time when the notifying condition is no longer satisfied.

6. The event notifying method as claimed in claim 1, comprising:
   time-sequentially storing generation of events by storing error information in an error register within the device when an event that cannot be notified through the queue or an event that does not need to be notified is generated.

7. A device comprising:
   a generating part configured to generate one or a plurality of events with respect to one or a plurality of processors and notify the events to the one or plurality of processors by storing said one or plurality of events in a queue;
   a managing part configured to manage a number of non-notified events existing in the queue by a counter unit which is incremented when an event is generated and is decremented with respect to an event that is extracted from the queue by the processor, said non-notified events being the events that are stored in the queue but are not yet extracted from the queue; and
   a part configured to control a time of notifying the processor, including to temporarily permit a negative value of the counter unit as an inconsistent state of the counter unit caused by differences in updating timings of the counter unit from the device and each processor until updating of the counter unit to resume a normal state of the counter unit, according to the updating state of the counter unit and one or more value states of the counter unit including the negative value.

8. The device as claimed in claim 7, wherein a notifying condition to each processor is when the number of non-notified events is greater than or equal to a threshold value.

9. The device as claimed in claim 7, wherein a notifying condition to each processor is when a non-notified event exists for a predetermined time or longer.

10. The device as claimed in claim 7, comprising:
a part configured to specify a plurality of processors to which a notification is to be made to notify a generation of an event; and
a part configured to change the processor at a notifying destination every time the notification is completed.

11. The device as claimed in claim 7, wherein the counter unit is provided within the device.

12. The device as claimed in claim 7, comprising:
an error register configured to store error information when an event that cannot be notified through the queue or an event that does not need to be notified is generated,
wherein the error register time-sequentially stores generation of events by storing the error information.

13. A processor system comprising:
one or a plurality of processors;
one or a plurality of devices configured to notify one or a plurality of events to each processor by storing said one or plurality of events in a queue; and
a counter unit configured to manage a number of non-notified events existing in the queue, said counter unit being incremented when an event is generated and being decremented with respect to an event that is extracted from the queue by the processor, said non-notified events being the events that are stored in the queue but are not yet extracted from the queue;
wherein each device controls a time of notifying a processor, including temporarily permitting a negative value of the counter unit as an inconsistent state of the counter unit caused by differences in updating timings of the counter unit from each device and each processor until updating of the counter unit to resume a normal state of the counter unit, according to the updating state of the counter unit and one or more value states of the counter unit including the negative value.

14. The processor system as claimed in claim 13, wherein a notifying condition to each processor is when the number of non-notified events is greater than or equal to a threshold value.

15. The processor system as claimed in claim 14, comprising:
a part configured to suppress notification to each processor for a certain time from a time when the notifying condition is no longer satisfied.

16. The processor system as claimed in claim 13, wherein a notifying condition to each processor is when a non-notified event exists for a predetermined time or longer.

17. The processor system as claimed in claim 16, comprising:
a part configured to suppress notification to each processor for a certain time from a time when the notifying condition is no longer satisfied.

18. The processor system as claimed in claim 13, wherein at least one device comprises an error register configured to time-sequentially store generation of events by storing error information when an event that cannot be notified through the queue or an event that does not need to be notified is generated.

19. The processor system as claimed in claim 13, wherein the counter unit is provided within at least one device.

* * * * *